(12) United States Patent
Muller

(10) Patent No.: US 7,117,881 B2
(45) Date of Patent: Oct. 10, 2006

(54) CONTROL SYSTEM

(75) Inventor: Eric Muller, Kaiserslautern (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 333 days.

(21) Appl. No.: 10/771,237

(22) Filed: Feb. 2, 2004

(65) Prior Publication Data
US 2004/0211469 A1    Oct. 28, 2004

(30) Foreign Application Priority Data
Feb. 11, 2003    (DE) .............................. 103 05 516

(51) Int. Cl.
*F16K 11/07*    (2006.01)
(52) U.S. Cl. .............................. 137/118.07; 137/625.48; 137/625.69
(58) Field of Classification Search ........... 137/118.01, 137/118.06, 118.07, 625.48, 625.67, 625.69
See application file for complete search history.

(56) References Cited

U.S. PATENT DOCUMENTS

| 3,592,281 | A | * | 7/1971 | Utter et al. ................. 180/6.48 |
| 3,800,670 | A | * | 4/1974 | Hufeld et al. ................. 91/420 |
| 4,458,720 | A | * | 7/1984 | Gierer .................... 137/625.48 |
| 4,718,308 | A | * | 1/1988 | Haley ........................... 477/39 |
| 5,314,385 | A | * | 5/1994 | Haley et al. ................... 474/28 |
| 5,417,622 | A | * | 5/1995 | Asayama et al. ............. 477/63 |
| 5,937,645 | A | * | 8/1999 | Hamamoto ................... 60/422 |

FOREIGN PATENT DOCUMENTS

DE    100 36 256 A1    *    3/2001

* cited by examiner

*Primary Examiner*—Ramesh Krishnamurthy
(74) *Attorney, Agent, or Firm*—Darby & Darby

(57) ABSTRACT

The invention relates to a control system, especially a hydraulic control system for a transmission, including a valve assembly, especially a directional valve assembly, designed for controlling a cooling system for a clutch and for ensuring a minimum level of pressure and suctioning function of a pump.

8 Claims, 2 Drawing Sheets

CONTROL SYSTEM

TECHNICAL FIELD

The invention relates to a control system including a valve assembly. More specifically, the present invention relates to a hydraulic control system for a transmission, including a directional valve assembly and designed for controlling a cooling system for a clutch and for ensuring a minimum level of pressure and the suctioning function of a pump.

BACKGROUND

In conventional control systems for transmissions, a first valve for cooling the clutch and a second valve for ensuring a minimum level of pressure and suctioning function of the pump are used in the cooling system return line.

SUMMARY

The object of the invention is to optimize the known control system with respect to production costs and function.

The object is attained with a control system, especially a hydraulic control system for a transmission, including a valve assembly, especially a directional valve assembly, designed for controlling a cooling system for a clutch and for ensuring a minimum level of pressure and suctioning function of a pump. One exemplary valve assembly includes only a single valve with which the cooling system for the clutch ensures the minimum level of pressure and the suctioning function of the pump. The use of a single valve significantly reduces production costs. Furthermore, the structural space required to hold the control system in the engine compartment of a motor vehicle is reduced.

One embodiment of the control system is characterized in that the valve includes a first actuating piston and a second actuating piston, which are housed in a valve chamber such that they can slide. The valve includes several, specifically at least seven, ports, at least one of which is connected to each of the clutch cooling system, a return line from the clutch cooling system, the pump, or a source of pilot pressure. It is particularly advantageous if one port is connected to the source of pilot pressure, one port is connected to the pump, one port is connected to the return line from the clutch cooling system, and at least one port, especially several ports, is or are connected to the clutch cooling system.

A further embodiment is characterized in that the clutch cooling system is connected to a first, a second, a third, and a fourth port on the valve chamber. This results in a multitude of control possibilities that have proven operationally advantageous.

A further embodiment of the control system is characterized in that the first port in the clutch cooling system is connected to a first end face of the first actuating piston. Via the first port in the clutch cooling system, pressure can be applied to the first end face of the first actuating piston, in order to shift it from a first position to a second position.

A further embodiment of the control system is characterized in that the first port in the clutch cooling system is connected to the second port in the clutch cooling system, for example via a connecting line, and the second clutch cooling system port is connected to the return line from the clutch cooling system. In this manner, the first end face of the first actuating piston can be acted upon by pressure from the return line of the clutch cooling system.

A further embodiment of the control system is characterized in that a spring presses against a second end face of the first actuating piston, which is opposite the first end face, thus the spring is coiled between the second end face of the first actuating piston and a first end face of the second actuating piston such that when the force of pressure acting against the first end face of the first actuating piston becomes greater than the spring force acting against the second end face of the first actuating piston, the first actuating piston is shifted from a first position to a second position, thus opening up a connection between the return line from the clutch cooling system and the pump port. In this manner the pumped fluid is recirculated from the return line of the clutch cooling system into the suction tract of the pump.

A further embodiment of the control system is characterized in that a second end face of the second actuating piston, which is arranged opposite the first end face of the second actuating piston, can be acted upon by the pilot pressure via the port from the pilot pressure source, in order to shift the second actuating piston such that a connection between the third and the fourth ports in the clutch cooling system is opened up. In this manner, the clutch cooling system is activated.

A further embodiment of the control system is characterized in that an aperture is located in a connecting line between the third and the fourth ports in the clutch cooling system. The aperture serves to feed a small volume flow to the clutch for purposes of lubrication.

A further embodiment of the control system is characterized in that a driver extends from the second end face of the first actuating piston, in the direction of the lengthwise axis of the first actuating piston. The driver serves to guide the spring, which is preferably designed as a helical compression spring.

A further embodiment of the control system is characterized in that an especially cap-shaped, shiftable separator element is arranged between the first and the second actuating pistons and serves to divide the space that houses the first actuating piston from the space that houses the second actuating piston. In this manner, different levels of pressure can be realized in the spaces that house the first and the second actuating pistons.

The invention also relates to a transmission having a control system as described above. In conventional hydraulic control systems for transmissions, among other things, a valve for the cooling of the clutch and a valve for ensuring a minimum level of pressure and the suctioning function of the pump in the cooling system return line are built in. With the present invention, the two valve functions are combined in a single valve, which may also be described as a minimum pressure retaining valve with a shifting function for the cooling system.

Further advantages, characterizing features, and details of the invention are disclosed in the following description, in which, with reference to the drawings, an exemplary embodiment is specified in detail. In this, each of the characterizing features mentioned in the claims and in the description can be considered critical to the invention on its own or in any combination.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DETAILED DESCRIPTION OF THE PREFERRED EMBODIMENTS

Figure 1:
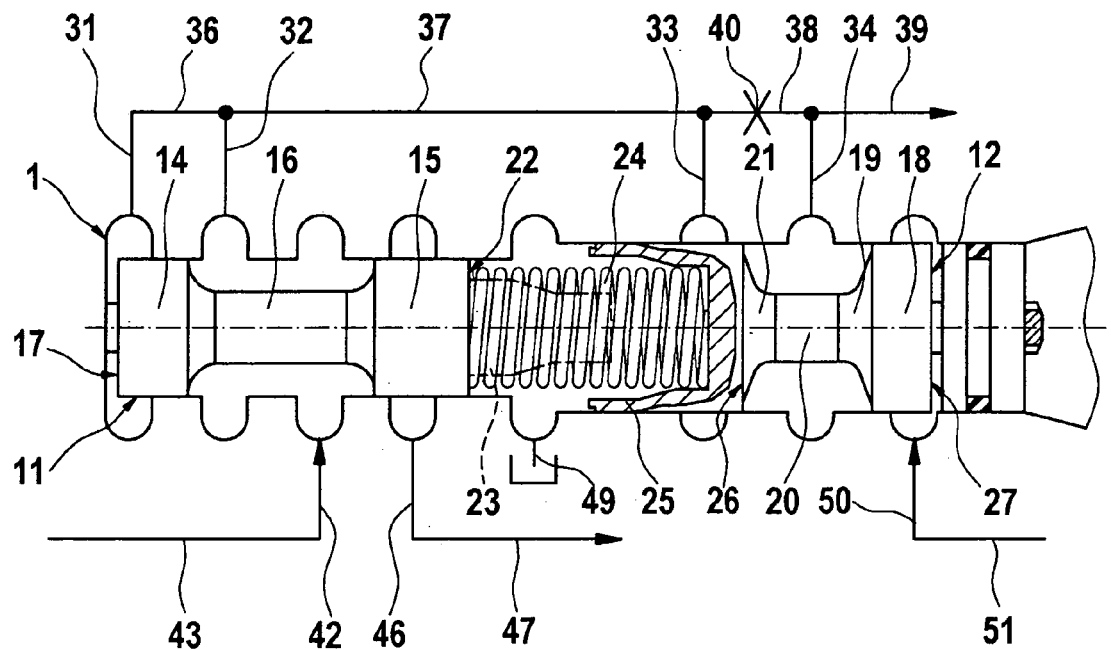
FIG. 1 is a side sectional view of a valve in its initial position, according to the present invention.

In FIG. 1, a valve chamber 1 of a valve as specified in the invention, intended for the hydraulic control of a transmission, is schematically represented. In the valve chamber 1, a first actuating piston 11 and a second 12 actuating piston are housed such that they can slide. The first actuating piston 11 is equipped at one end with a circular cylindrical section 14, and at its other end with a circular cylindrical section 15. Between the two circular cylindrical sections 14 and 15 is a center section 16, also circular cylindrical, and having a smaller outside diameter. The transition sections between the circular cylindrical sections 14, 15 and the center section 16 are curved. At the open end of the circular cylindrical section 14 is a first end face 17 of the first actuating piston 11. At the open end of the circular cylindrical section 15 is a second end face 22 of the first actuating piston 11.

The second actuating piston 12 is equipped at one end with a circular cylindrical section 18 that has a constant outside diameter. Attached to the circular cylindrical section 18 is a section 19, which has a decreasing outside diameter. The section 19 is in turn followed by a circular cylindrical section 20, which has a constant outside diameter. Attached to the other end of the second actuating piston 12 is a section 21, which has an increasing outside diameter, and whose dimensions correspond to those of the section 19. The second actuating piston 12, like the first actuating piston 11, has a larger outside diameter at its two ends compared to its center.

Arranged on the second end face 22 of the first actuating piston 11 is a driver 23. The driver 23 includes first a circular cylindrical section with a constant outside diameter, then a tapered section, and at its open end, a circular cylindrical section with a reduced outside diameter. The driver 23 serves to fasten and guide a helical compression spring 24, which is positioned over the driver 23. An end of the helical compression spring 24 lies against the second end face 22 of the first actuating piston 11. The other end of the helical compression spring 24 lies inside and against a cap-shaped separator element 25, which is housed inside the valve chamber 1 such that it can slide. Against the outer side of the cap-shaped separator element 25 lies a first end face 26, which is formed on the open end of the second actuating piston 12. At the open end of the circular cylindrical section 18 of the second actuating piston 12 is a second end face 27. The first actuating piston 11 has a narrower outside diameter than the second actuating piston 12.

Four ports 31, 32, 33, and 34 are provided on the valve chamber 1, all of which are connected to the clutch cooling system. The ports 31 through 34 are also referred to as the first, second, third, and fourth clutch cooling system ports. The first 31 and the second 32 clutch cooling system ports are connected to one another via a connecting line 36. The second 32 and the third 33 clutch cooling system ports are connected to one another via a connecting line 37. The third 33 and the fourth 34 clutch cooling system ports are connected to one another via a line 38, in which an aperture 40 is positioned. A line 39 leads from the fourth clutch cooling system port 34 to the clutch cooling system.

In addition, a port 42 is provided on the valve chamber 1 and is connected via a line 43 to the cooling system return line. Furthermore, a port 46 is provided on the valve chamber 1, and is connected via a line 47 to the suctioning tract of the pump. Via a port 49, the space that houses the helical compression spring 24 is connected to a tank. Via the port 49 it is ensured that the space that houses the compression spring 24 remains pressureless. Finally, the valve chamber 1 is equipped with a port 50, which is connected via a line 51 to a source of pilot pressure.

The first clutch cooling system port 31 is connected to the first end face 17 of the first actuating piston 11. When the first actuating piston 11 is in the position shown in FIG. 1, the second clutch cooling system port 32 is connected to the cooling system return line port 42 via the center section 16 of the first actuating piston 11. However, the second clutch cooling system port 32 can also be closed off by the circular cylindrical section 14 of the first actuating piston 11.

Figure 2:
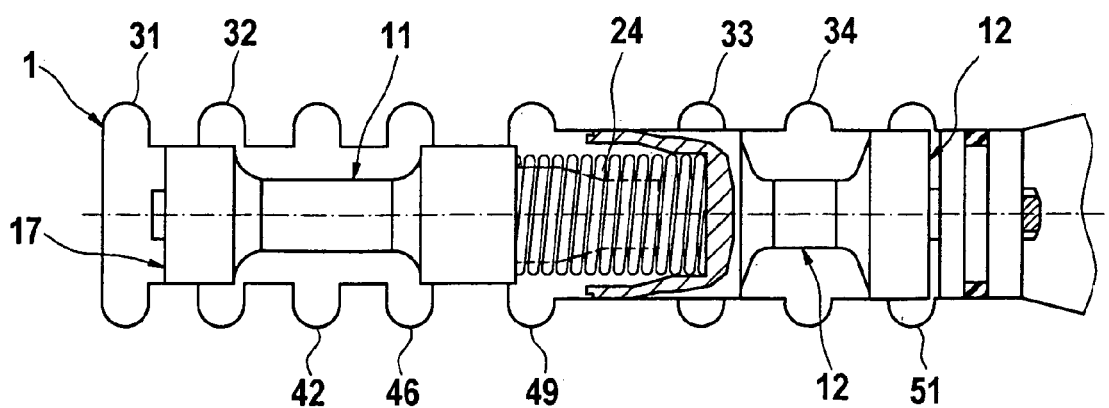
FIG. 2 is a side sectional view of the valve of FIG. 1 in its operating position.
Figure 3:
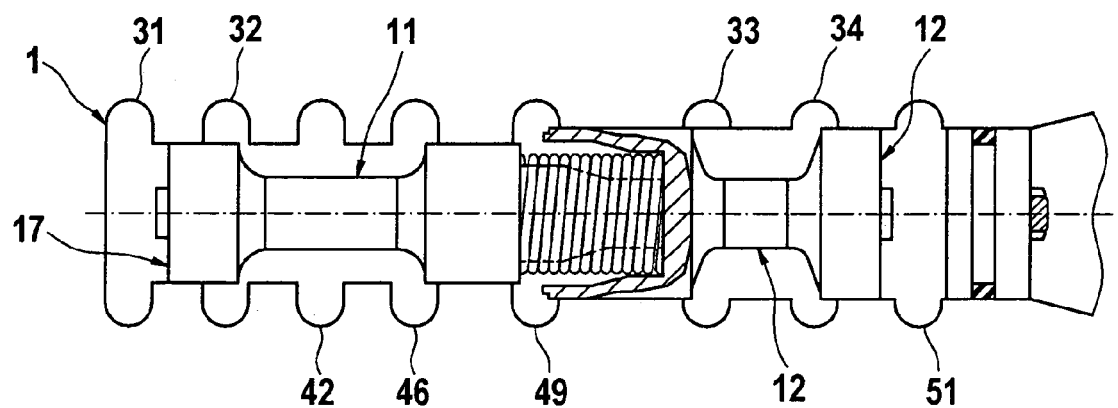
FIG. 3 is a side sectional view of the valve of FIG. 1 in a third operating position, in which the clutch cooling system is activated.

When the valve is in the operating positions shown in FIGS. 1 and 2, the section 21 of the second actuating piston 12 in the valve chamber 1 is arranged between the third 33 and the fourth 34 clutch cooling system ports, hence there is no connection between the third 33 and the fourth 34 clutch cooling system ports via the valve chamber 1. In the valve operating position that is shown in FIG. 3, the second actuating piston 12 is shifted such that a connection between the third 33 and the fourth 34 clutch cooling system ports via the valve chamber 1 is opened up.

The pilot pressure port 50 is connected to the second end face 27 of the second actuating piston 12. In the operating position shown in FIG. 1, the pump port 46 is closed off by the circular cylindrical section 15 of the first actuating piston 11. When the first actuating piston 11 is shifted as is shown in FIGS. 2 and 3, a connection is opened up between the cooling system return line port 42 and the pump port 46.

In the initial valve position shown in FIG. 1, the fluid flowing back from the cooling system flows out of the line 43 via the cooling system return line port 42 to the second clutch cooling system port 32. From the second clutch cooling system port 32, the fluid flows through the line 36 and the first clutch cooling system port 31 to the first end face 17 of the first actuating piston 11. A smaller volume flow of the fluid is directed from the second clutch cooling system port 32 to the clutch via the lines 37, 38, 39 and the aperture 40, which has a diameter of approximately 0.8 mm, for the purpose of lubricating the bearings.

The fluid is a hydraulic fluid, which is also referred to as hydraulic oil. The hydraulic fluid that acts upon the first end face 17 of the first actuating piston 11 generates a force that opposes the prestressed helical compression spring 24, which is positioned between the first 11 and the second 12 actuating pistons. When the level of pressure prevailing at the first end face 17 of the first actuating piston 11 or the force of pressure acting against it, becomes greater than the prestressed force of the helical compression spring 24, then the first actuating piston 11 is shifted toward the second actuating piston 12. With this shifting of the first actuating piston 11, as is shown in the FIGS. 2 and 3, a connection is opened upon between the cooling system return line port 42 and the pump port 46. As a result of this, the fluid is forced back out of the cooling system return line 43 via the cooling system return line port 42, the pump port 46, and the pump port line 47 to the suctioning tract of the pump (not illustrated here). The difference in pressure between the ports 42 and 46 represents the set minimum pressure of the valve.

The valve operating position shown in FIG. 2 corresponds to the normal driving situation of a motor vehicle.

If during operation the clutch becomes severely heated, making it necessary to cool the clutch, then the second end face 27 of the second actuating piston 12 is pressurized with a pilot pressure via the pilot pressure port 50 and the pilot pressure line 51. The pilot pressure then implements a shifting of the second actuating piston 12 from the position shown in FIGS. 1 and 2 to the position shown in FIG. 3.

In FIG. 3, it is apparent that the shifting of the second actuating piston 12 toward the first actuating piston 11 effected by the pilot pressure causes the connection between the third clutch cooling system port 33 and the fourth clutch cooling system port 34 to be opened up. This leads to some degree to the formation of a bypass, which bridges the aperture 40 in the line 38. When the valve is in this position shown in FIG. 3, the clutch cooling system is active.

The shifting of the second actuating piston 12 toward the first actuating piston 11 further causes an increase in the tension of the helical compression spring 24. This in turn causes the adjusted minimum pressure of the valve to be increased. This is desirable, because a higher level of pressure is required for cooling the clutch than the minimum level of pressure established beforehand. Beyond a certain pressure level the helical compression spring 24 acts as a block, and the two actuating pistons 11 and 12 act as a single-component slide valve. The adjusted coolant pressure is then established over the difference in diameter between the actuating pistons 11 and 12. This valve operating position is shown in FIG. 3 and represents the driving situation when the cooling system is engaged.

It will be appreciated by persons skilled in the art that the present invention is not limited to the embodiments described thus far with reference to the accompanying drawings; rather the present invention is limited only by the following claims.

What is claimed is:

1. A control system comprising:
a directional valve assembly designed for controlling a cooling system for a clutch and for ensuring a minimum pressure and suctioning function of a pump, wherein the valve assembly comprises a single valve for ensuring cooling of the clutch and the minimum pressure and the suctioning function of the pump, and wherein the valve comprises a first actuating piston, a second actuating piston, and at least seven ports, and first and the second actuating pistons are housed in a valve chamber and are slidable, and at least one of the at least seven ports are connected to at least one of the clutch cooling system, a return line for the clutch cooling system, the pump, and a pilot pressure source, wherein the at least seven ports of the valve comprise a first, a second, a third, and a fourth port on the valve chamber, and the clutch cooling system is connected to the first, the second, the third, and the fourth ports on the valve chamber.

2. The control system pursuant to claim 1, wherein the first port on the valve chamber is connected to a first end face of the first actuating piston.

3. The control system pursuant to claim 2, wherein the first port on the valve chamber is connected to the second port on the valve chamber via a connecting line, and the second port on the valve chamber is connected to the return line of the clutch cooling system.

4. The control system pursuant to claim 2, further comprising: a spring acting against a second end face of the first actuating piston, the second end face being opposite the first end face of the first actuating piston, and the spring is coiled between the second end face of the first actuating piston and a first end face of the second actuating piston such that when a pressure force acting against the first end face of the first actuating piston becomes greater than a spring force acting against the second end face of the first actuating piston, the first actuating piston is shifted from a first position to a second position, opening up a connection between the return line for the clutch cooling system and the port connected to the pump.

5. The control system pursuant to claim 4, further comprising: a second end face of the second actuating piston opposite the first end face of the second actuating piston, wherein the second end face of the second actually piston can be pressurized by a pilot pressure via the port connected to the pilot pressure source, in order to shift the second actuating piston such that a connection is opened up between the third port and the fourth port on the valve chamber.

6. The control system pursuant to claim 5, further comprising an aperture arranged in a connecting line between the third and the fourth ports on the valve chamber.

7. The control system pursuant to claim 4, further comprising a driver extending from the second end face of the first actuating piston, in the direction of a lengthwise axis of the first actuating piston.

8. The control system pursuant to claim 4, further comprising a cap-shaped, shiftable separator element between the first and the second actuating pistons, the separator element separating a space that houses the first actuating piston from a space that houses the second actuating piston.

* * * * *